(12) United States Patent
Becker et al.

(10) Patent No.: US 12,497,241 B2
(45) Date of Patent: Dec. 16, 2025

(54) BLOCK STORAGE ARRANGEMENT

(71) Applicant: Jungheinrich Aktiengesellschaft, Hamburg (DE)

(72) Inventors: Michael Becker, Hainburg (DE); Timm Morawietz, Tholey-Überroth (DE); Holger Cremer, Düsseldorf (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 523 days.

(21) Appl. No.: 18/116,613

(22) Filed: Mar. 2, 2023

(65) Prior Publication Data

US 2023/0278798 A1    Sep. 7, 2023

(30) Foreign Application Priority Data

Mar. 3, 2022   (EP) .................................... 22159999

(51) Int. Cl.
*B65G 1/04* (2006.01)
*B65G 1/137* (2006.01)

(52) U.S. Cl.
CPC ...... *B65G 1/1373* (2013.01); *B65G 2201/025* (2013.01)

(58) Field of Classification Search
CPC ............ B65G 1/1373; B65G 2201/025; B65G 2207/40; B65G 57/302; B65G 1/0471; B65G 1/0407; B65G 1/0421; B65G 2203/0208
See application file for complete search history.

(56) References Cited

U.S. PATENT DOCUMENTS

| | | | |
|---|---|---|---|
| 3,096,891 A | 7/1963 | Verrinder et al. | |
| 4,690,601 A * | 9/1987 | Delius | B65G 57/302 414/795.2 |
| 10,781,043 B1 * | 9/2020 | Kalm | B65G 1/0464 |
| 2022/0063914 A1 * | 3/2022 | Langen | B65B 43/305 |
| 2022/0144546 A1 | 5/2022 | Tendo et al. | |

FOREIGN PATENT DOCUMENTS

| | | | | |
|---|---|---|---|---|
| CN | 111392302 A * | 7/2020 | ........... | B65G 1/0492 |
| DE | 20 2012 103 138 | 10/2012 | | |
| DE | 11 2019 006 910 | 11/2021 | | |
| JP | S59-64825 | 4/1984 | | |

OTHER PUBLICATIONS

Europe Extended Search Report conducted in counterpart Europe Appln. No. 22159999.6 (Aug. 26, 2022).

* cited by examiner

*Primary Examiner* — Justin Holmes
(74) *Attorney, Agent, or Firm* — GREENBLUM & BERNSTEIN, P.L.C.

(57) ABSTRACT

Block storage arrangement and method. The block storage arrangement includes at least one container receiving space; a loading space below, in a direction of gravity, the at least one container receiving space; at least one loading vehicle, which can be moved in the loading space to a position below the at least one container receiving space, having a lifting device; and a container detecting device arranged at an upper end, in the direction of gravity, of the at least one container receiving space. A lifting movement of the lifting device is interrupted when the container detecting device detects a container passing the container detecting device.

19 Claims, 9 Drawing Sheets

BLOCK STORAGE ARRANGEMENT

CROSS-REFERENCE TO RELATED APPLICATION

This application claims priority under 35 U.S.C. § 119(a) to Europe Application No. 22 15 9999.6 filed Mar. 3, 2022, the disclosure of which is expressly incorporated by reference herein in its entirety.

BACKGROUND

1. Field of the Invention

Embodiments relate to a block storage arrangement having at least one container receiving space, a loading space below, in the direction of gravity, the container receiving space, and at least one loading vehicle, which can be moved in the loading space to a position below the container receiving space and has a lifting device with a controller.

Furthermore, embodiments relate to a method for operating a block storage arrangement having at least one container receiving space, a loading space below, in the direction of gravity, the container receiving space, and at least one loading vehicle, which can be moved in the loading space to a position below the container receiving space and has a lifting device with a controller, with which containers are stored from below in the container receiving space with the aid of the loading vehicle.

2. Discussion of Background Information

A block storage arrangement, which may also be referred to as a "stack storage arrangement," is used to receive a plurality of containers, which may be arranged in one or more container receiving spaces in the form of stacks. Since the containers in the stack stand directly on top of each other, a high packing density of the containers in the direction of gravity results. The container receiving spaces can also be arranged relatively close together transversely to the direction of gravity, such that very good utilization of the available installation space is also achieved here.

In the present case, the container receiving space is loaded from below, i.e., a container is stored in the container receiving space from below, in the direction of gravity, and removed from the container receiving space downwards.

For this purpose, the loading vehicle, which can be moved in the loading space, is used.

Since no handling equipment is required above, in the direction of gravity, the container receiving space, the block storage arrangement, if arranged in a production hall, can make virtually full use of the height of the production hall.

If a container is placed in a container receiving space, it is moved to a position below the container receiving space with the aid of the loading vehicle. The lifting device then lifts the container until it enters the container receiving space. If there are already one or more containers in the container receiving space, then the new container to be stored lifts such container or container stack and pushes it upwards. The lifting movement continues until the new container to be stored has been moved past a holding device and, when it is lowered after being lifted, comes to rest on the holding device and is held there at a distance above the floor of the loading space.

A problem can arise if the container receiving space is already completely full, i.e., the maximum permissible number of containers is located in the container receiving space.

In this case, a container would be moved upwards, in the direction of gravity, out of the container receiving space. If the block storage arrangement is located in a production hall and uses the height of the production hall, this can cause damage. For example, the ceiling of the production hall, the container, and/or the objects stored in the container can be damaged. If the container exits the top of the container receiving space, it is no longer guided, which can also lead to malfunctions and reduced availability. Even if the block storage arrangement is located in an enclosure, which can be desirable for fire safety reasons, for example, the upward movement of a container out of the container receiving space can cause severe damage.

SUMMARY

Embodiments are directed to minimizing the risk of damage during operation of a block storage arrangement.

According to embodiments, a block storage arrangement of the type mentioned above includes a container detecting device arranged at the upper end, in the direction of gravity, of the container receiving space. The container detecting device cooperates with a controller, which interrupts a lifting movement of the lifting device if the container detecting device detects the passing of a container.

Thus, if a container passes the container detecting device, it is detected, and further lifting of the container stack by the lifting device of the loading vehicle is immediately prevented. This can be used to prevent a container from being moved too far out of the upper end of a container receiving space, so that it cannot cause damage there. All that is required is cooperation between the container detecting device and the lifting device of the loading vehicle. However, such cooperation can be set up relatively easily, as will be shown below.

Preferably, the container detecting device has an arm that projects into the container receiving space transversely to the direction of gravity. Thus, if a container is lifted and touches the arm and takes it with it, the arm is lifted with it. This is a relatively simple way to detect the presence of a container and its movement. Thus, the detection of the container happens mechanically.

Preferably, the container detecting device is connected to a signaling device, and the loading vehicle has a receiver connected to the controller, which detects a signal from the signaling device at least if the loading vehicle is located in the position below the loading space. It is sufficient, if the receiver receives the signal, if the loading vehicle is located in the position below the loading space, because only in this position can the upward movement of the lifting device lead to an undesired exit of a container from the container receiving space. Thus, the information that a container has reached the upper end of the container receiving space is detected by the container detecting device and passed on to the signaling device, which in turn passes on the corresponding information via the receiver to the controller of the loading vehicle. This makes it easy to transmit the information to the loading vehicle and its controller, even if there is no direct connection between the container detecting device and the loading vehicle.

Preferably, the container detecting device is mechanically connected to the signaling device. The transmission of information from the container detecting device to the signaling device is thus mechanical, such that no further auxiliary energy, such as electrical energy, is required. This results in a highly reliable design.

Preferably, the signaling device has a signaling element that can be moved by the container detecting device in the direction of gravity. The detection device can then easily determine whether the signaling element is located in a position where the container detecting device has not yet detected a container, or in a position where the container detecting device has been moved by the container that moves out of the container receiving space.

Preferably, a holding frame is arranged between the container receiving space and the loading space, and the signaling device is guided in the holding frame in the direction of gravity. The signaling device and especially the signaling element then has a predetermined position perpendicular to the direction of gravity. Only the position in the direction of gravity can be changed, which makes it easier for the receiver to distinguish between the different positions of the signaling element.

Preferably, the loading vehicle detects whether the signaling element is located in a predetermined region in the direction of gravity. If the signaling element is located in its "lowest" position, this is an indication that the container detecting device has not been actuated by a container and has been displaced upwards. In this case, the lifting device can continue to work and lift a container. If the signaling element has moved a predetermined distance upwards in the direction of gravity and can no longer be detected by the receiver, this is a clear indication that the container detecting device has been detected and moved by a container. In this case, the lifting device will immediately stop its lifting movement.

Preferably, the receiver is formed as an optical receiver. An optical receiver can optically determine whether or not the signaling element is located in the predetermined region in the direction of gravity. This is a relatively simple way to ensure non-contact transmission of the information in question.

Preferably, the loading vehicle has a light transmitter, and the signaling element is formed as a reflector. The light transmitter, if the loading vehicle is located in the position below the loading space, can direct a beam of light, which can be visible or invisible to the human eye, in the direction of the signaling element. If the signaling element reflects this light beam back, and such reflection is directed so as to reach the receiver, this is an indication that the signaling element is located in the predetermined region, and the container detecting device has not detected the passing of a container. If the light beam is not reflected to the receiver, this is an indication that a container has actuated the container detecting device, and a lifting movement must be stopped.

Preferably, a stand is arranged at at least one corner of the container receiving space, and the container detecting device is arranged at the upper end, in the direction of gravity, of the stand. The stand can then simultaneously define the rest position of the container detecting device. If necessary, a stop is provided at the end of the stand, which stop defines the rest position of the container detecting device. i.e., the position at which a container has not yet reached the upper end of the container stacking space. The "end of the stand" here means a region up to which a container can be lifted. This does not necessarily have to be the physical end of the stand at the top in the direction of gravity.

Preferably, a connection between the container detecting device and the signaling device extends through the stand. The connection is then protected from external influences. The risk of damage from a stack of containers tipping over, for example, is small.

Here, it is preferred that the connection be formed as a cable or rod. Since the connection is substantially loaded in tension, a cable or rod is sufficient.

Preferably, the stand is arranged at least at a corner of at least one further container receiving space, and the container detecting device also cooperates with the further container receiving space. The container detecting device can then be provided in common for several container receiving spaces. For example, if the stand is located where the corners of four container receiving spaces meet, then one container detecting device is sufficient to prevent a container from being improperly pushed upwards out of one of the four container receiving spaces.

Preferably, the stand has a profile with at least one rail formed with an angle, which rail serves as a guide for a container arranged in the container receiving space, wherein the container detecting device projects into the angle of the rail. This is a simple way to ensure that the container detecting device can detect movement of the container out of the container receiving space.

Preferably, the container detecting device is guided in the stand. This gives the container detecting device a defined position in a direction perpendicular to the direction of gravity. Thereby, one can ensure that it is always positioned in such a way that it can detect a passing container.

According to embodiments, a method of the type mentioned above includes detecting the passing of a container at the upper end, in the direction of gravity, of the container receiving space with the aid of a container detecting device, and interrupting the lifting movement of the lifting device if a container passes the container detecting device.

This prevents a container from being moved too far out of the container receiving space. Damage associated with this can be easily avoided.

Embodiments are directed to a block storage arrangement that includes at least one container receiving space; a loading space below, in a direction of gravity, the at least one container receiving space; at least one loading vehicle, which can be moved in the loading space to a position below the at least one container receiving space, having a lifting device; and a container detecting device arranged at an upper end, in the direction of gravity, of the at least one container receiving space. A lifting movement of the lifting device is interrupted when the container detecting device detects a container passing the container detecting device.

According to embodiments, the lifting device can include a controller and the container detecting device may be configured to cooperate with the controller in interrupting the lifting movement of the lifting device when the container detecting device detects a container passing the container detecting device. Further, a signaling device can be connected to the container detecting device and a receiver can be connected to the controller, such that the receiver may be arranged to detect a signal from the signaling device at least when the loading vehicle is located in the position below the at least one container receiving space.

In embodiments, the container detecting device can have an arm that projects into the at least one container receiving space transversely to the direction of gravity.

In accordance with other embodiments, a signaling device can be connected to the container detecting device and a receiver can be connected to the loading vehicle, such that the receiver may be arranged to detect a signal from the signaling device at least when the loading vehicle is located in the position below the at least one container receiving space. Further, the container detecting device may be mechanically connected to the signaling device. Also, the signaling device may have a signaling element that is movable in the direction of gravity by the container detecting device. Further, a holding frame may be arranged between the container receiving space and the loading space, such that the signaling device may be guidable in the holding frame in the direction of gravity. The loading vehicle can detect whether the signaling element is located in a predetermined region in the direction of gravity. Further, the receiver can be formed as an optical receiver. The loading vehicle can have a light transmitter and the signaling element is formed as a reflector.

According to other embodiments, a stand can be arranged at at least one corner of the at least one container receiving space. The container detecting device can be arranged at an upper end, in the direction of gravity, of the stand. A connection between the container detecting device and the signaling device may extend through the stand. The connection can be formed as a cable or rod. The stand may be arranged at least at one corner of at least one further container receiving space, and the container detecting device can be arranged to cooperate with the further container receiving space. Further, the stand can have a profile with at least one rail formed with an angle, the rail serving as a guide for a container arranged in the at least one container receiving space. The container detecting device may project into the angle of the rail.

Embodiments are directed to a method for operating a block storage arrangement having at least one container receiving space, a loading space below, in the direction of gravity, the at least one container receiving space, and at least one loading vehicle, which can be moved in the loading space to a position below the at least one container receiving space, wherein, via the loading vehicle, containers are stored in the at least one container receiving space from below. The method includes detecting an uppermost container in the at least one container receiving space passing a container detecting device located at an upper end, in the direction of gravity, of the at least one container receiving space; and interrupting a lifting movement of the lifting device when the uppermost container passing the container detecting device is detected.

In accordance with still yet other embodiments, when the loading vehicle is arranged below the at least one container receiving space, the method can further include establishing an optical connection between the loading vehicle and a signaling device coupled to the container detecting device. The uppermost container passing the container detecting device may cause movement of at least part of the signaling device, which interrupts the optical connection.

Other exemplary embodiments and advantages of the present invention may be ascertained by reviewing the present disclosure and the accompanying drawing.

BRIEF DESCRIPTION OF THE DRAWINGS

The invention is described below with reference to a preferred exemplary embodiment in conjunction with the drawing. The following are shown therein.

DETAILED DESCRIPTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
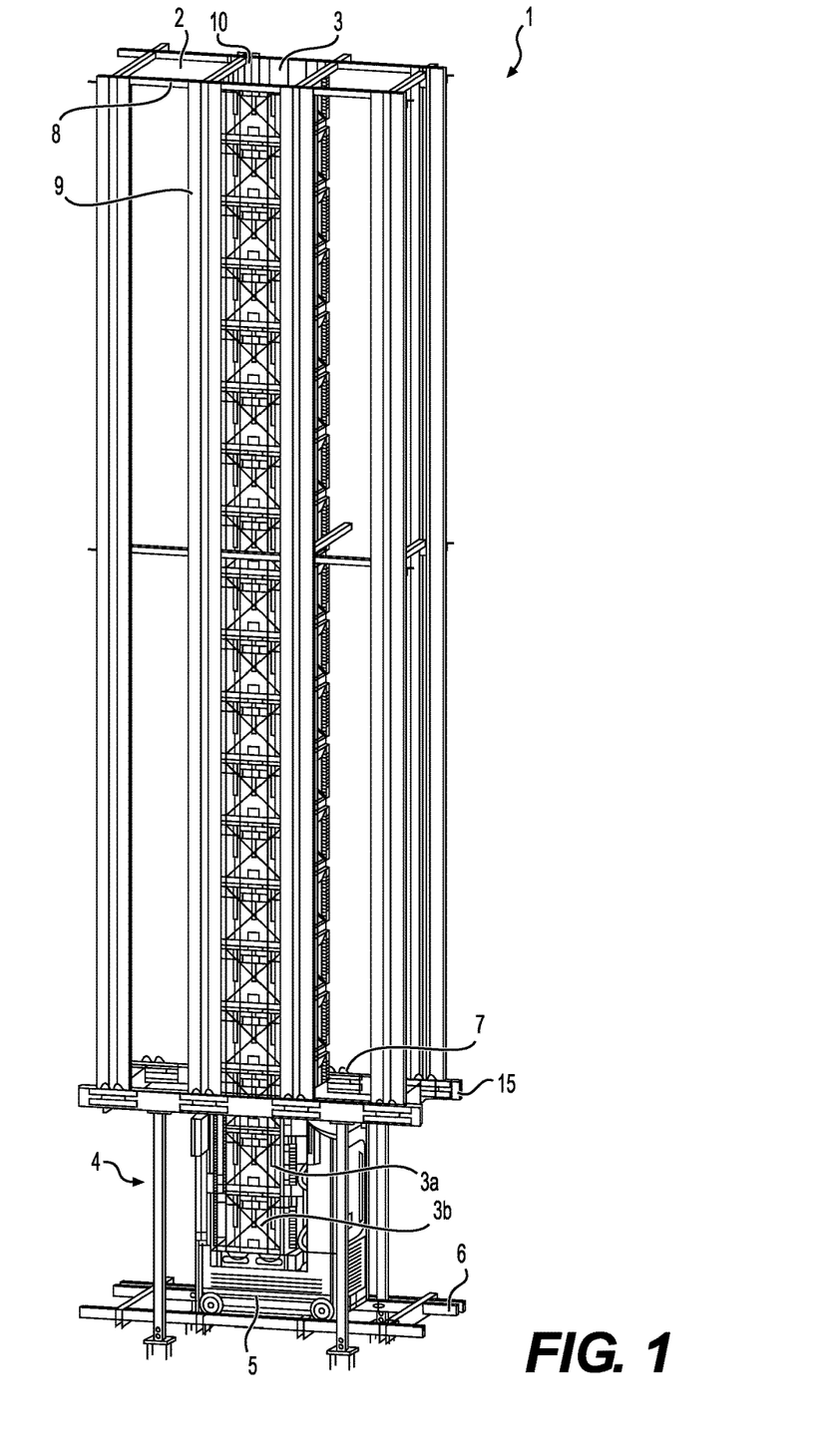
FIG. 1 illustrates a schematic illustration of a part of a block storage arrangement.

FIG. 1 shows a highly schematized cutout of a block storage arrangement 1 in a perspective view. The block storage arrangement 1 has several container receiving spaces (or chambers) 2, three of which are shown adjacent to each other in FIG. 1. However, the block storage arrangement 1 will typically have a much larger number of container receiving spaces 2 in a row. In addition, several rows of container receiving spaces 2 will be arranged adjacent to each other.

Several containers 3 are arranged in a container receiving space 2. In the present case, the central container receiving space 2 is completely filled with containers 3.

A loading space (or chamber) 4, in which a loading vehicle 5 can be moved, is located below, in the direction of gravity, the container receiving spaces 2. The loading vehicle 5 can be moved, for example, on rails 6 arranged in the loading space 4. However, it is also possible to have the loading vehicle 5 move onto a floor of the loading space 4.

In the present case, the container receiving spaces 2 of the block storage arrangement 1 are filled from below with containers 3. The containers 3 are also removed from the container receiving spaces 2 downwards in the direction of gravity.

To store a container 3 in a container receiving space 2, the loading vehicle 5 in the loading space 4 is moved to a position in which it is located below the loading space 2, in which the container 3 is to be stored. The loading vehicle 5 carries a container 3a to be stored or, as shown, a stack of two containers 3a, 3b to be stored. The loading vehicle 5 then lifts the containers 3a, 3b until they enter the loading space 2. The containers 3a, 3b are then guided past a holding device 7, which is located at the lower end of the container receiving space 2, i.e., between the container receiving space 2 and the loading space 4. If the bottom container 3b of the stack of containers 3a, 3b has been moved past the holding device 7, the stack is lowered again by the loading vehicle 5, and the lowermost container 3b is held by the holding device 7.

Figure 2:
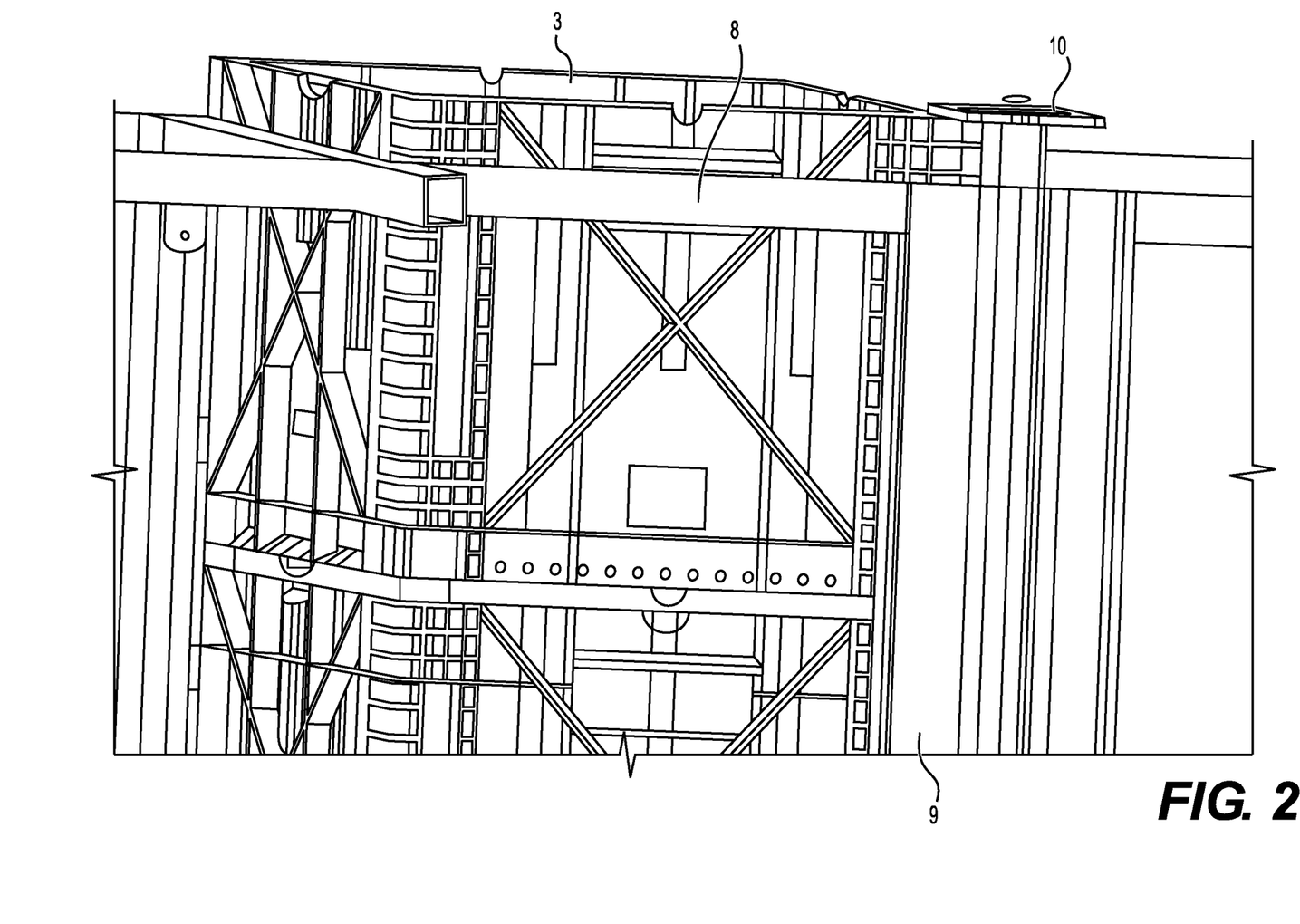
FIG. 2 illustrates an upper end of a container receiving space, with containers pushed out of the upper end.

If there is already a stack of containers 3 in the container receiving space 2, this stack is likewise lifted. This can cause the uppermost container 3 of the stack to move out of the block storage arrangement 1, as shown in FIG. 2. For example, it is moved past crossbeams 8, which connect the stands 9 to each other.

If the block storage arrangement 1 is arranged in a production hall and takes up almost all of the height of the production hall, such a situation can lead to damage. For example, the ceiling of the production hall, the container, and/or the objects stored in the container may be damaged. If the container exits the top of the container receiving space, it is no longer guided, which can also lead to malfunctions and reduced availability.

In many cases, the block storage arrangement 1 is also encapsulated by an enclosure—for example, to be able to create an atmosphere with reduced oxygen content. Then, if the uppermost container 3 is moved too far out of the block storage arrangement 1, it can damage this enclosure.

Figure 3:
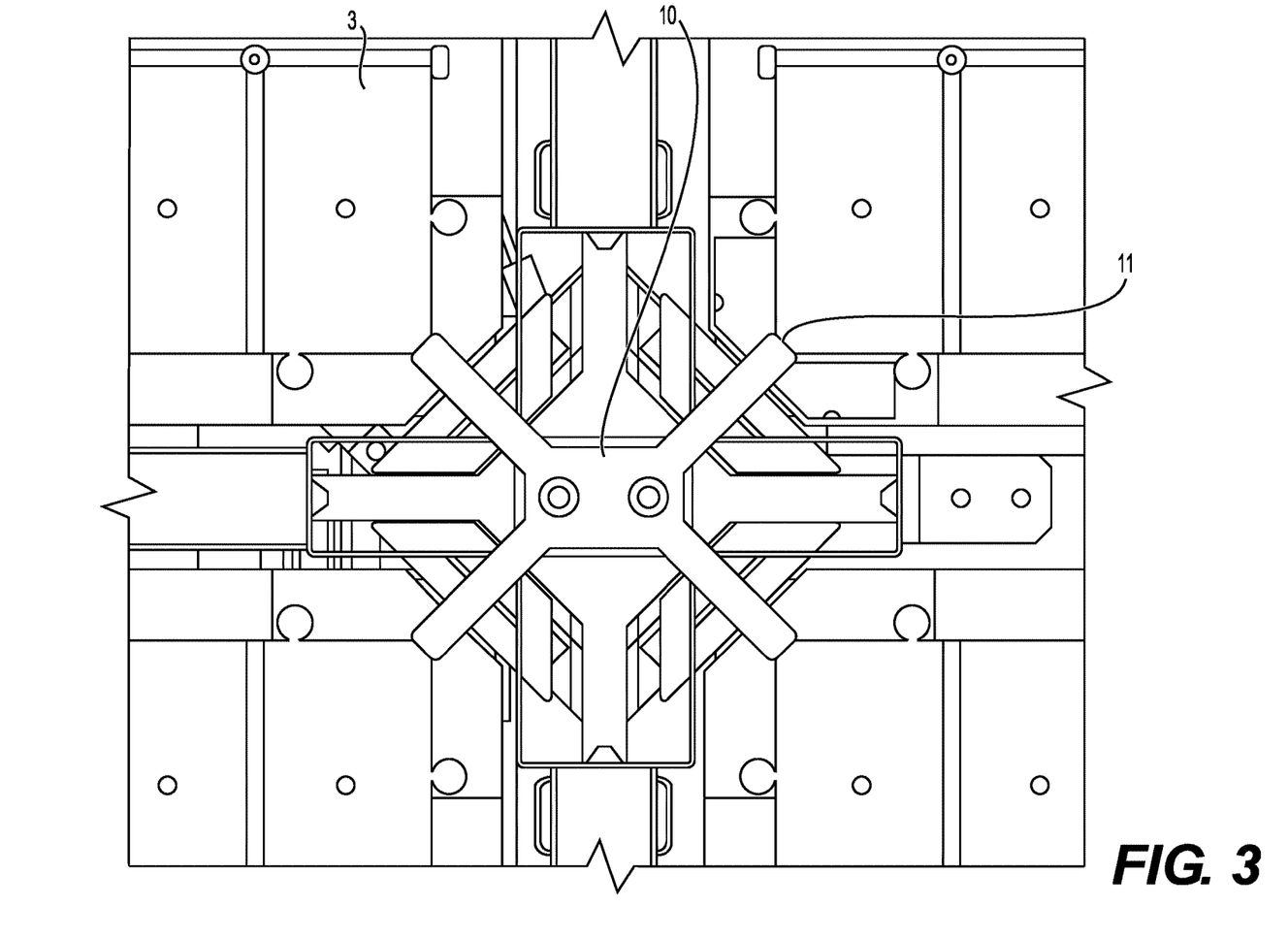
FIG. 3 illustrates a container detecting device in a top view.

To minimize the risk of such damage, the block storage arrangement 1 has a container detecting device 10 at the upper end of the container receiving space, which is partially shown in FIG. 3.

The container detecting device 10 has several arms 11, each of which extends into a container receiving space 2 transversely to the direction of gravity. Thus, if a container 3 is moved upwards in the direction of gravity out of a container receiving space, it comes into contact with an arm 11 of the container detecting device 10 from below, in the direction of gravity, and takes with it the container detecting device 10 in a further movement upwards in the direction of gravity.

As soon as such a movement of the container detecting device 10 is detected, the loading vehicle 5 must interrupt the lifting movement of the containers 3a, 3b. For this purpose, the lifting device of the loading vehicle 5 is connected, in a manner not shown in more detail, to a controller, which interrupts the lifting movement of the lifting device, if the container detecting device 10 detects the passing of a container 3, in that it is, for example, lifted.

Figure 4:
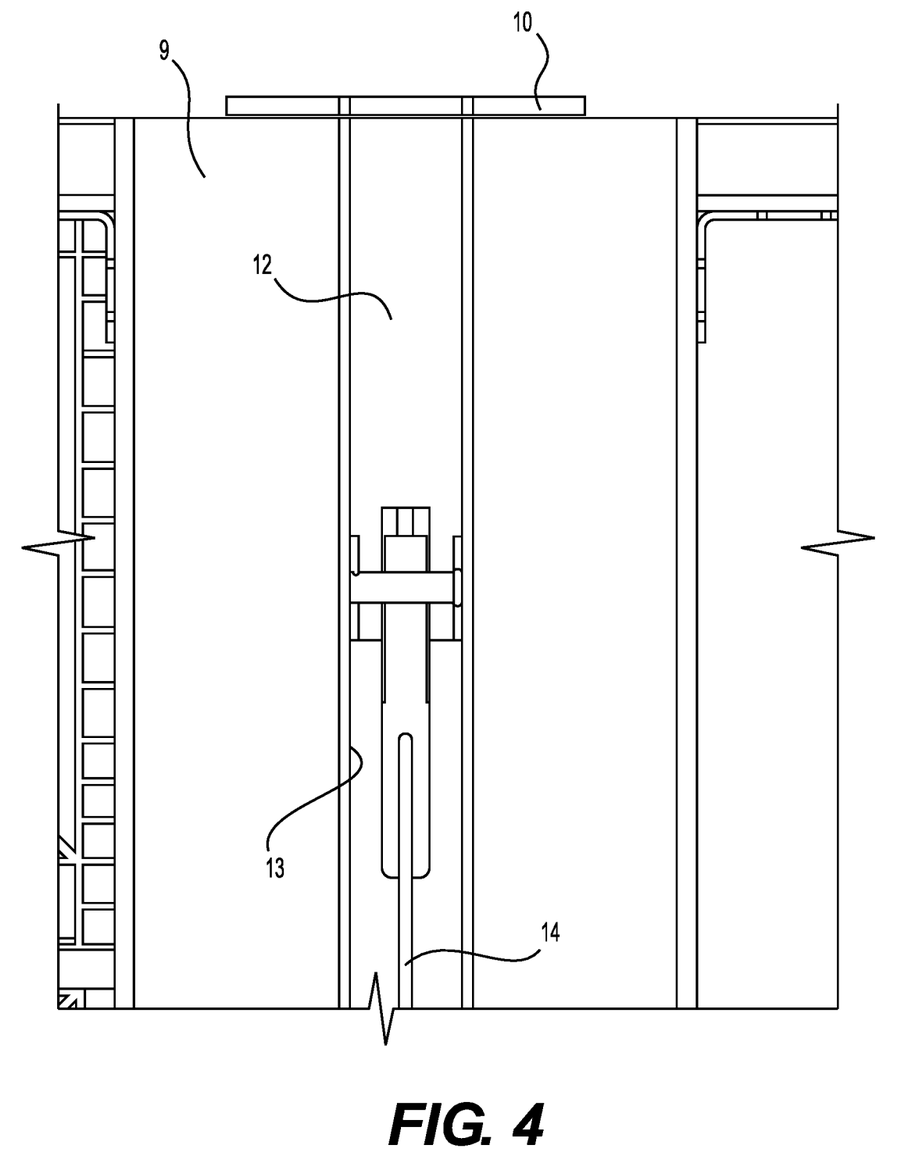
FIG. 4 illustrates a schematic sectional view of a stand at the upper end of a container receiving space.

FIG. 4 shows a sectional view of an upper end, in the direction of gravity, of a stand 9, in which the container detecting device 10 is mounted. The container detecting device 10 has an extension 12, which is guided in a hollow profile 13 of the stand 9. The hollow profile 13 is polygonal, e.g., rectangular, such that the extension 12 and thus the container detecting device 10 can be moved only in the direction of gravity, but not perpendicular to the direction of gravity. The container detecting device 10 also cannot be twisted, ensuring that the arms 11 always extend into a container receiving space 2.

The extension 12 is connected to a cable 14 (a rod can also be provided), wherein the cable 14 is also guided through the hollow profile 13.

The stand 9 rests on a holding frame 15 and is connected to the holding frame 15. The cable 14 is connected to a signaling element 16, which can be formed as a reflector, for example. The signaling element 16 is arranged on a guide rod 17, which is guided in the holding frame 15. This means that the signaling element 16 can also move only in the direction of gravity, but not transversely to it.

The loading vehicle 5 has a light transmitter 18 (FIGS. 8 and 9) that emits a light beam 19 directed at a point or region where the signaling element 16 is located in the fault-free state. i.e., if no container 3 has yet been moved out of the upper end of a container receiving space 2. The light beam 19 can be visible to the human eye. However, it can also be invisible to the human eye. For example, it can be infrared or ultraviolet light.

Figure 8:
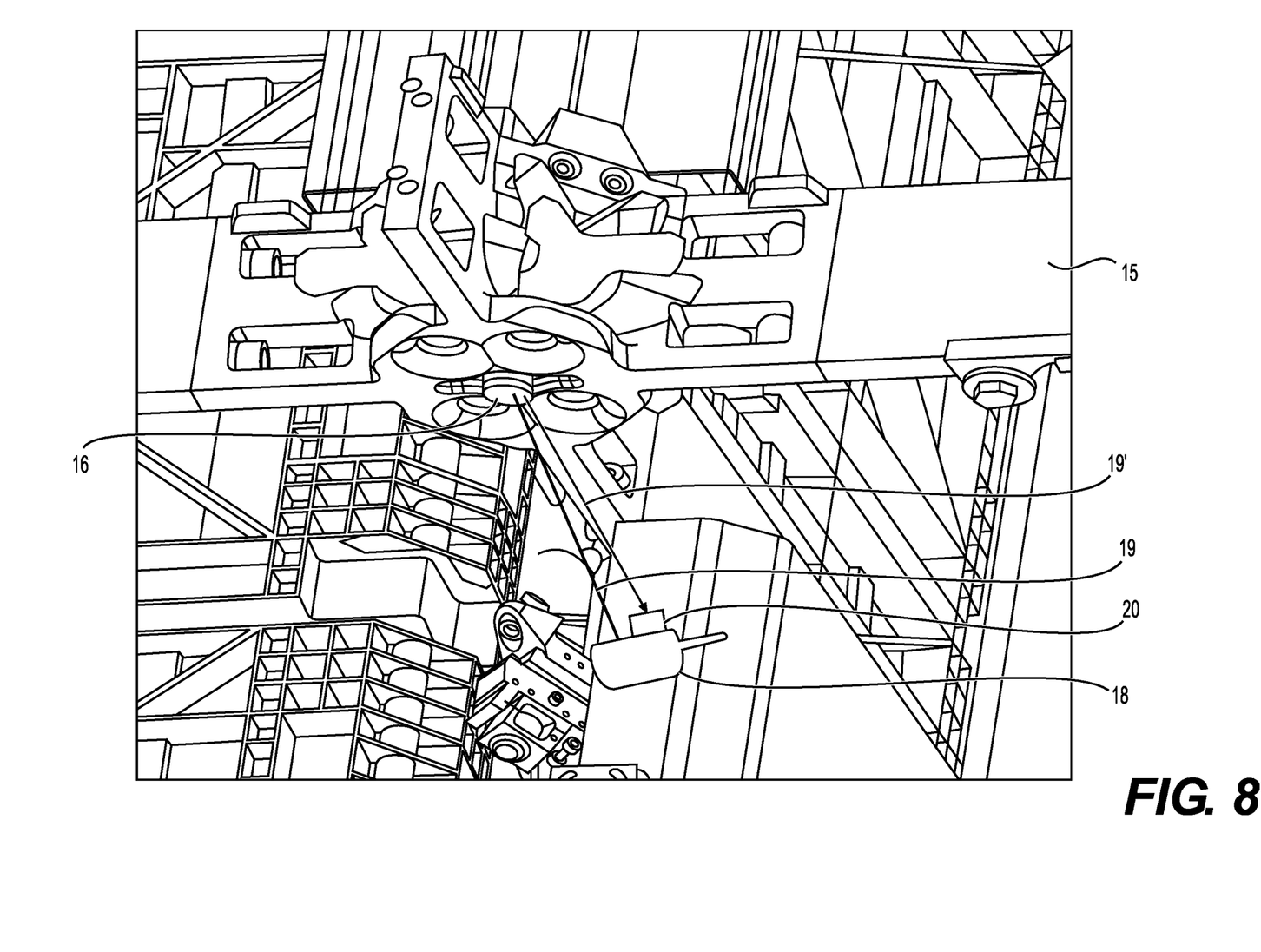
FIG. 8 illustrates a schematic illustration explaining the cooperation between the signaling device and the receiver in the fault-free state.

In FIG. 8, the signaling element 16 is struck by the light beam 19. The light beam 19 is then reflected back to the light transmitter 18, which includes an optical receiver 20 that receives a reflection 19' of the light beam 19. If the receiver 20 receives the reflection 19' of the light beam 19, this is an unambiguous indication that it is a fault-free state in which no container 3 has yet been moved out of the upper end, in the direction of gravity, of a container receiving space 2.

Figure 9:
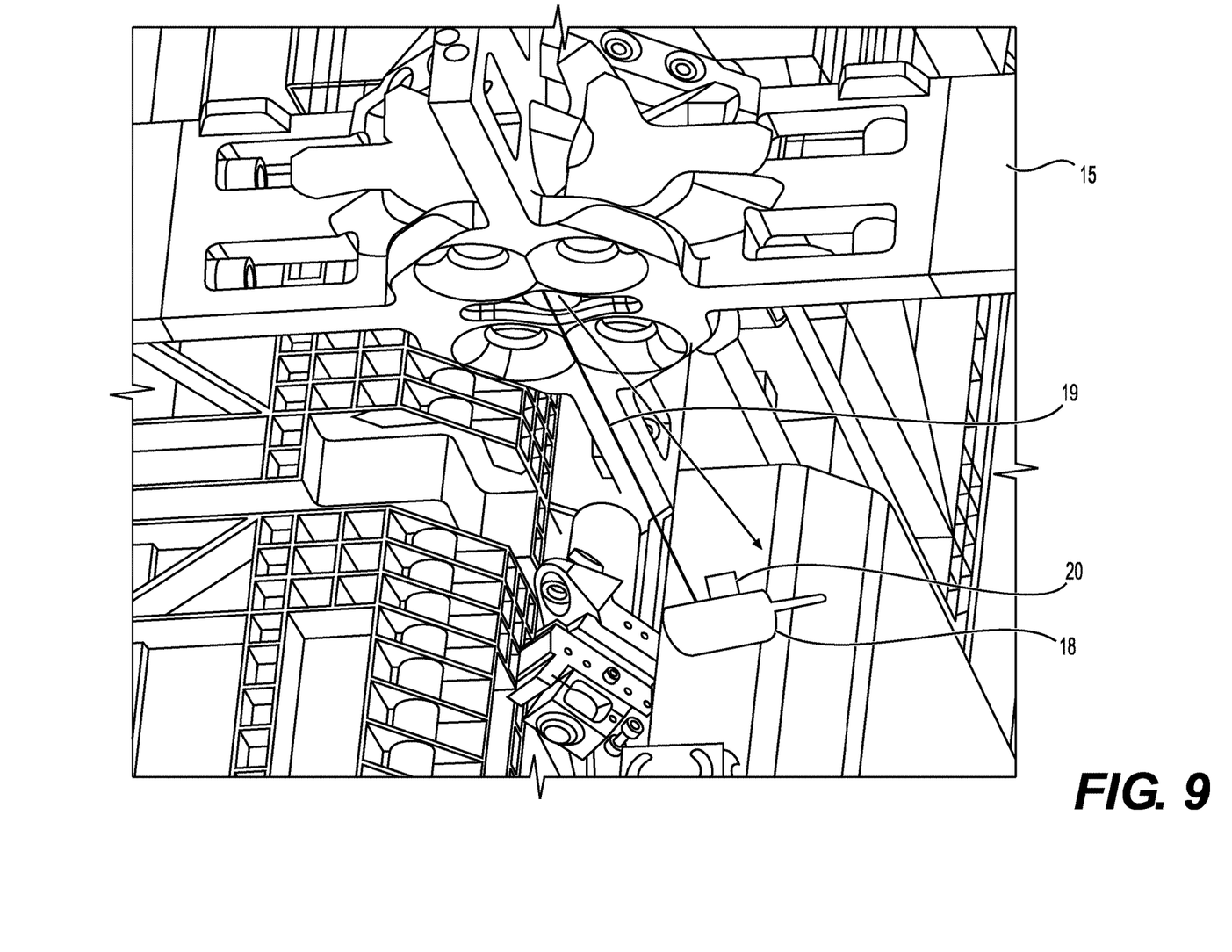
FIG. 9 illustrates the view according to FIG. 8 in the fault state.

If, on the other hand, the light beam 19 is not reflected by the signaling element 16 or, as shown in FIG. 9, the signaling element 16 directs the reflection 19' of the light beam 19 elsewhere, i.e., the receiver 20 does not receive a corresponding signal, the signaling element is not located in a predetermined height range in the direction of gravity, which is an indication that the container detecting device 10 has been raised. Specifically, if the container detecting device 10 is raised, the signaling element 16 is also raised, leaving the region that can be hit by the light beam 19 or from which it can no longer direct the reflection 19' towards the receiver 20.

Thus, the signaling element 16 forms part of a signaling device 16, 17 that is connected to the container detecting device 10 via the cable 14 or, in general, a connection. This connection—in this case, the cable 14—runs through the stand 9 and is thus protected.

This is a purely mechanical connection, such that no auxiliary power is required to signal the lifting of the container detecting device 10 by the signaling element 16.

The signaling device 16, 17 and the container detecting device 10 are both guided in the stand 9. The signaling element 16 forcibly moves along with the container detecting device 10.

Figure 5:
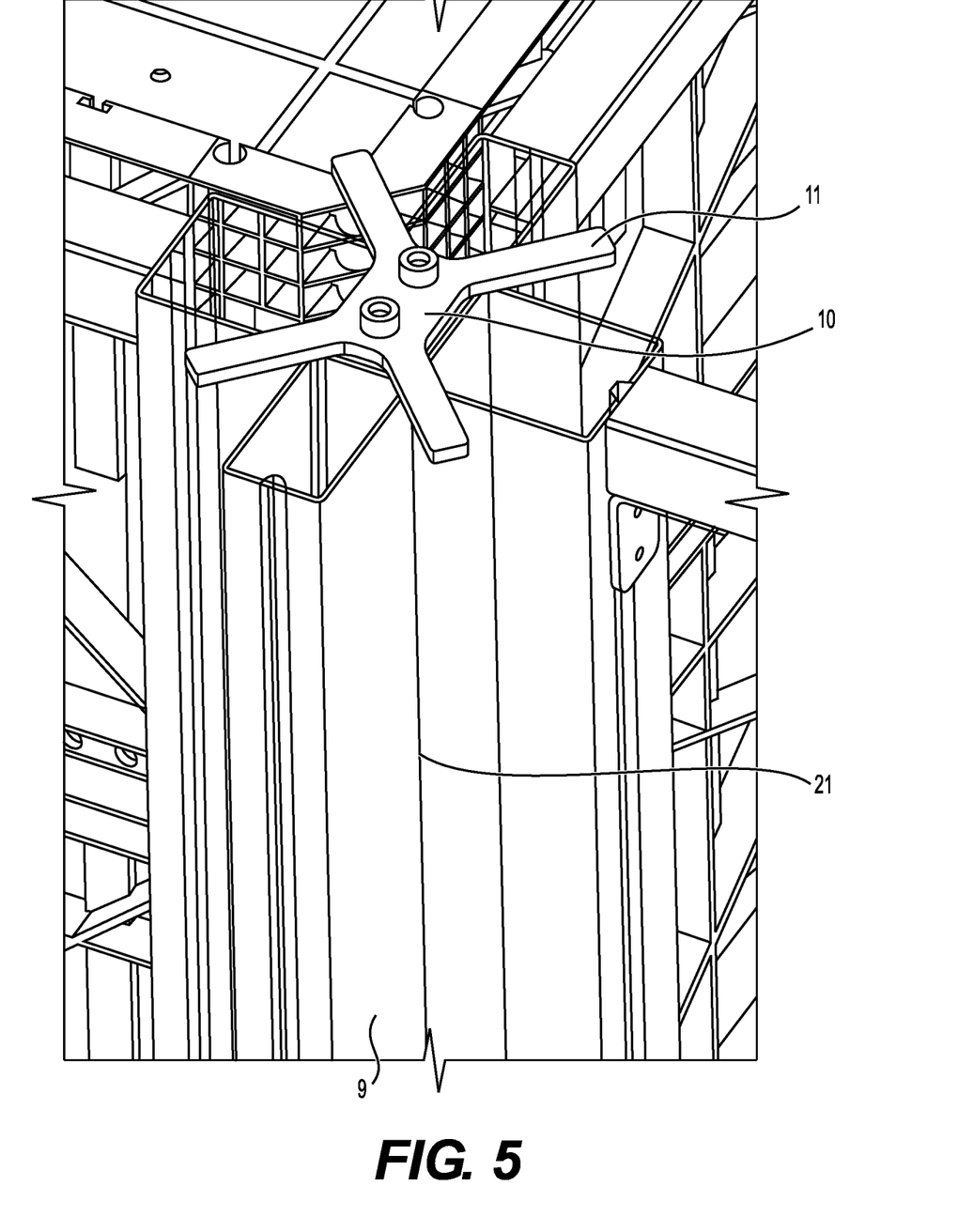
FIG. 5 illustrates a perspectival view of the container collection device.
Figure 6:
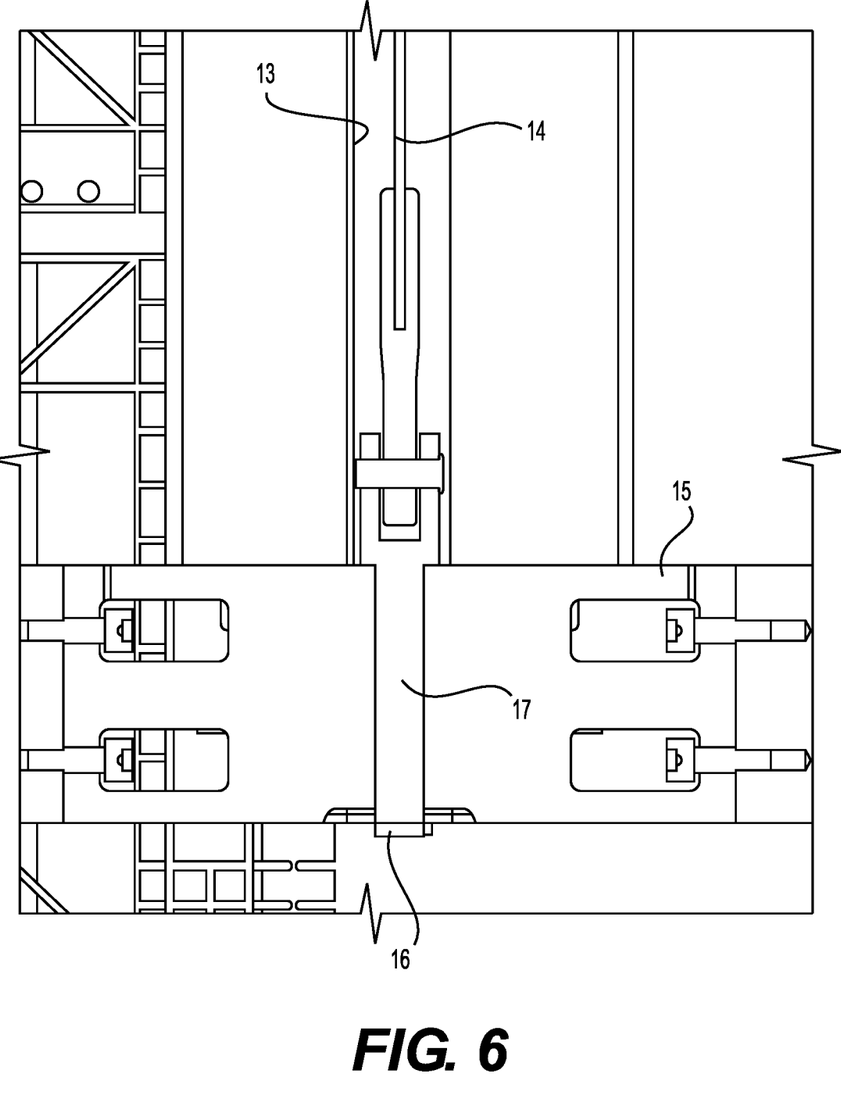
FIG. 6 illustrates a sectional view of a lower end of a stand.

As mentioned above in connection with FIG. 3, and as can also be seen in FIG. 5, one container detecting device 10 is sufficient to detect an exit of containers from four container receiving spaces 2. Accordingly, it is sufficient that a stand 9 be arranged at at least one corner of the container receiving space. If this stand 9 is then located at the four corners of four adjacent container receiving spaces 2, all four container receiving spaces 2 will be monitored.

Figure 7:
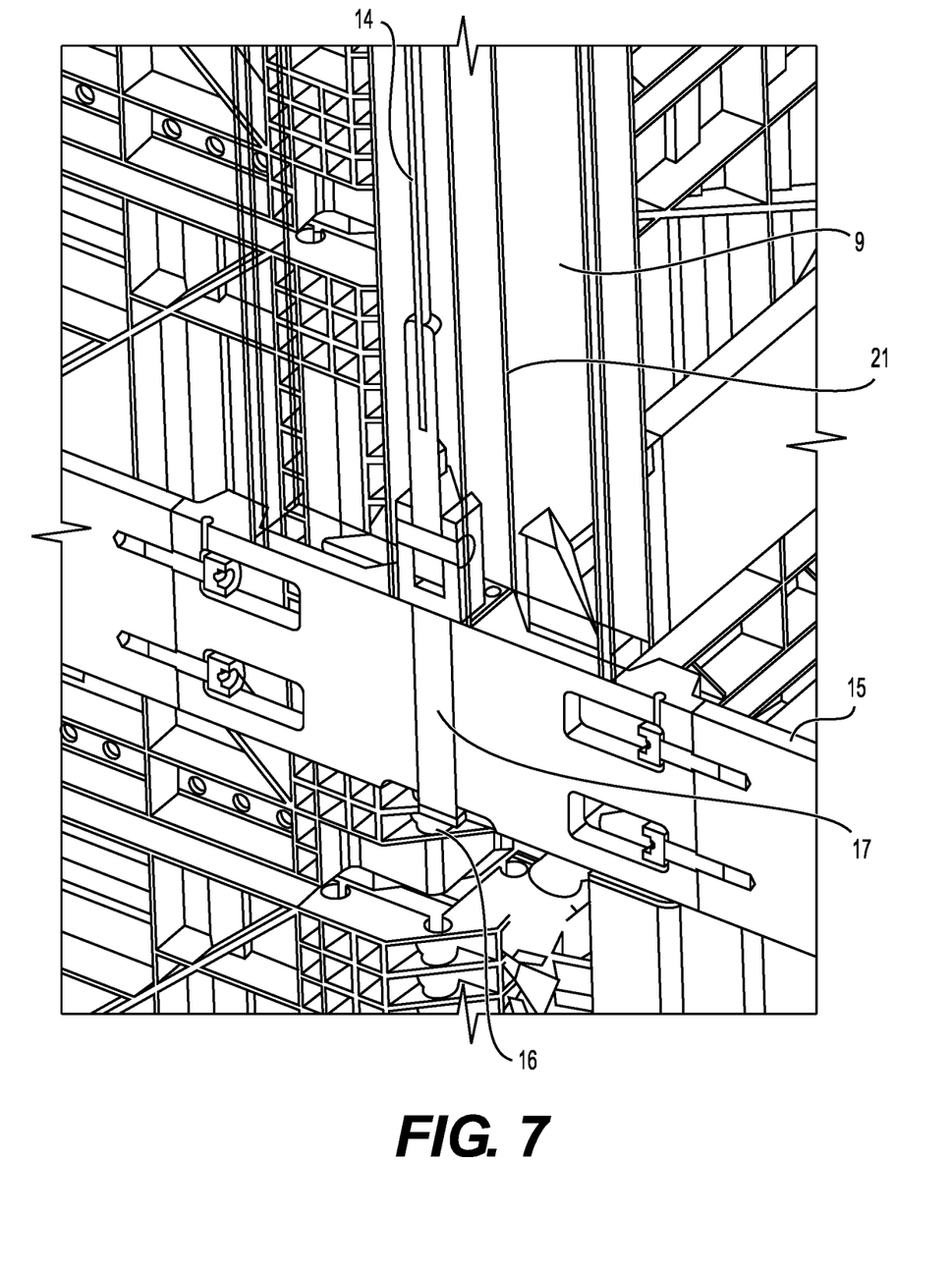
FIG. 7 illustrates the view according to FIG. 6 in a perspective view.

As can be seen in FIGS. 5 and 7, the stand 9 has a profile with at least one rail formed with an angle 21, which rail serves as a guide for a container 3 arranged in the container receiving space 2, wherein the container detecting device 10 projects into the angle 21 of the rail 9. In the present case, an arm 11 of the container detecting device 10 projects into the angle 21. Here, "angle" refers to an intermediate space between two flanks. i.e., a corner of the container receiving space, so to speak. It is quite possible that, in the angle, an inclined surface or a rounding is arranged along which the containers 3 can slide.

The container detecting device 10 can now be used to reliably prevent containers 3 from being pushed out of the upper end of a container receiving space 2. As soon as a container 3 contacts the container detecting device 10 and lifts it beyond a predetermined level, the signaling element 16 of the signaling device is moved such that the receiver 20 on the loading vehicle 5 no longer detects a corresponding signal, and the controller of the loading vehicle 5 interrupts the lifting movement of the containers 3a, 3b that have just been lifted. Moreover, it is sufficient if the receiver 20 can only detect the corresponding signal, i.e., the reflected light beam 19, if the loading vehicle 5 is actually located in a position below a loading space 2. It is then possible to form the controller of the lifting device in such a way that it responds to the signal (reflection 19' of the light beam 19)

only if the loading vehicle is actually located in a position in which a container 3a, 3b can be stored in the container stacking space 2.

If the lifting device interrupts the lifting movement, the new container 3a to be stored can no longer be stored in the container receiving space 2.

This also automatically ensures, in a simple manner, that no dangerous situation can arise even when a container 3a is removed from the container receiving space 2.

To remove a container from the container receiving space 2, the loading vehicle 5 is moved back to a position below the container receiving space 2, and the lifting device is operated to lift the lowermost container of the stack until it comes free from the holding device 7 and the holding device 7 can be opened. The lifting device of the loading vehicle 5 can then be lowered, and the lowermost container of the stack can be lowered out of its container receiving space 2 until the holding device 7 holds the next (or, if two containers are to be removed, the next but one) container in place. The removed container(s) can then be moved out of the block storage arrangement 1 by the loading vehicle 5.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A block storage arrangement comprising:
   at least one container receiving space;
   a loading space below, in a direction of gravity, the at least one container receiving space;
   at least one loading vehicle, which can be moved in the loading space to a position below the at least one container receiving space, having a lifting device; and
   a container detecting device arranged at an upper end, in the direction of gravity, of the at least one container receiving space,
   wherein a lifting movement of the lifting device is interrupted when the container detecting device detects a container passing the container detecting device.

2. The block storage arrangement according to claim 1, wherein the lifting device includes a controller and the container detecting device is configured to cooperate with the controller in interrupting the lifting movement of the lifting device when the container detecting device detects a container passing the container detecting device.

3. The block storage arrangement according to claim 2, further comprising:
   a signaling device connected to the container detecting device; and
   a receiver connected to the controller,
   wherein the receiver is arranged to detect a signal from the signaling device at least when the loading vehicle is located in the position below the at least one container receiving space.

4. The block storage arrangement according to claim 1, wherein the container detecting device has an arm that projects into the at least one container receiving space transversely to the direction of gravity.

5. The block storage arrangement according to claim 1, further comprising:
   a signaling device connected to the container detecting device; and
   a receiver connected to the loading vehicle,
   wherein the receiver is arranged to detect a signal from the signaling device at least when the loading vehicle is located in the position below the at least one container receiving space.

6. The block storage arrangement according to claim 5, wherein the container detecting device is mechanically connected to the signaling device.

7. The block storage arrangement according to claim 5, wherein the signaling device has a signaling element that is movable in the direction of gravity by the container detecting device.

8. The block storage arrangement according to claim 7, further comprising a holding frame arranged between the container receiving space and the loading space, wherein the signaling device is guidable in the holding frame in the direction of gravity.

9. The block storage arrangement according to claim 7, wherein the loading vehicle detects whether the signaling element is located in a predetermined region in the direction of gravity.

10. The block storage arrangement according to claim 7, wherein the receiver is formed as an optical receiver.

11. The block storage arrangement according to claim 7, wherein the loading vehicle has a light transmitter and the signaling element is formed as a reflector.

12. The block storage arrangement according to claim 1, further comprising a stand arranged at at least one corner of the at least one container receiving space,
   wherein the container detecting device is arranged at an upper end, in the direction of gravity, of the stand.

13. The block storage arrangement according to claim 12, wherein a connection between the container detecting device and the signaling device extends through the stand.

14. The block storage arrangement according to claim 13, wherein the connection is formed as a cable or rod.

15. The block storage arrangement according to claim 12, wherein the stand is arranged at least at one corner of at least one further container receiving space, and the container detecting device is arranged to cooperate with the further container receiving space.

16. The block storage arrangement according to claim 12, wherein the stand has a profile with at least one rail formed with an angle, the rail serving as a guide for a container arranged in the at least one container receiving space,
   wherein the container detecting device projects into the angle of the rail.

17. A method for operating a block storage arrangement having at least one container receiving space, a loading space below, in the direction of gravity, the at least one container receiving space, and at least one loading vehicle, which can be moved in the loading space to a position below the at least one container receiving space, wherein, via the loading vehicle, containers are stored in the at least one container receiving space from below, the method comprising:
   detecting an uppermost container in the at least one container receiving space passing a container detecting device located at an upper end, in the direction of gravity, of the at least one container receiving space; and interrupting a lifting movement of the lifting device when the uppermost container passing the container detecting device is detected.

18. The method according to claim 17, wherein, when the loading vehicle is arranged below the at least one container receiving space, the method further comprises:

establishing an optical connection between the loading vehicle and a signaling device coupled to the container detecting device.

19. The method according to claim 18, wherein the uppermost container passing the container detecting device causes movement of at least part of the signaling device, which interrupts the optical connection.

* * * * *